United States Patent Office 3,257,277
Patented June 21, 1966

3,257,277
SYNERGISTIC ANTIHYPERTENSIVE COMPOSITIONS
Kao Hwang, Waukegan, Ill., assignor to Abbott Laboratories, North Chicago, Ill., a corporation of Illinois
No Drawing. Filed May 31, 1963, Ser. No. 284,327
7 Claims. (Cl. 167—65)

The present invention is concerned generally with synergistic antihypertensive compositions and more specifically with such compositions containing N-methyl-N-propargyl-benzylamine or acid-addition salts thereof and 2-methyl-3 - chloromethyl - 6 - chloro-7-sulfamyl-3,4-dihydro-1,2,4-benzothiadiazine-1,1-dioxide or alkali metal salts thereof.

N-methyl-N-propargylbenzylamine (hereinafter referred to by its generic name of pargyline) can be readily prepared by refluxing equimolar proportions of propargyl bromide and N-methylbenzlamine in ethanol and in the presence of a hydrohalide acceptor such as sodium carbonate. Pargyline itself boils at 97° C. at 11 mm. pressure. The hydrochloride which melts at 155° C. can be prepared by dissolving pargyline in ether and adding ethereal hydrogen chloride to precipitate the solid salt. Similar pharmaceutically acceptable, acid-addition salts can be prepared by methods well known to those skilled in the chemical art. Suitable salts which can be employed in the compositions herein described include the hydrobromide, sulfate, phosphate, picrate, succinate, citrate, tartrate, fumarate, oxalate, benzoate, salicylate, glycolate, nicotinate, ascorbate, maleate or lactate.

The compound 2 - methyl - 3-chloromethyl-6-chloro-7-sulfamyl - 3,4 - dihydro-1,2,4-benzothiadiazine-1,1-dioxide (hereinafter referred to by its generic name of methyclothiazide) employed as one of the active constituents of the compositions of this invention can be conveniently prepared by the reaction of one molecular proportion of 4 - amino - 6 - chloro-3-(methylsulfamyl) - benzene-sulfonamide with at least one molecular proportion of chloroacetaldehyde in an inert solvent such as water or acetone at a temperature of from 20° to 100° C. Upon completion of the reaction, the reaction mixture is cooled to precipitate the desired product which is separated by filtration and purified by recrystallization from water or methanol. Methyclothiazide melts at 225° C. with decomposition. Alkali metal salts of this compound can be readily prepared by procedures well known to those skilled in the chemical art.

This invention is based upon the discovery that when compositions containing one part by weight of methyclothiazide and from 2.5 to 15 parts by weight of pargyline are orally administered to warm blooded animals, there is obtained a marked synergistic effect on the lowering of blood pressure as compared to the effect obtained when either compound is employed alone. Compositions containing one part by weight of methyclothiazide or one of its alkali metal salts and from 5 to 10 parts by weight of pargyline or one of its acid-addition salts are specifically effective in markedly lowering blood pressure when properly formulated and orally administered to a living host.

A tablet, capsule or pill provides a convenient, oral form of administering the compositions of the invention. These forms may be compounded with inert fillers, binders, lubricants, dyes and pigments normally employed in the tablet or capsule making art. Such materials include talc, stearic acid, corn starch, lactose, acacia, magnesium stearate and polyvinylpyrrolidine. The amounts of these ingredients can vary widely and depend mainly upon the kind and size of tablet or capsule desired. A complete tablet or capsule containing 2.5 mg. of methyclothiazide and 25 mg. of pargyline hydrochloride is convenient for administration and may normally be administered once or more times daily depending upon the needs of the particular host to relieve high blood pressure.

The following examples set forth a typical formulation and the desirable synergistic blood pressure lowering effect obtained when a combination of pargyline and methyclothiazide is administered to hypertensive humans.

EXAMPLE 1

*Formula for 1000 tablets*

| Ingredient: | Amount in grams |
|---|---|
| Methyclothiazide | 2.5 |
| Pargyline hydrochloride | 25.0 |
| Lactose | 112.0 |
| Polyvinylpyrrolidine (PVP) | 9.0 |
| Magnesium stearate | 1.5 |
| Absolute alcohol sufficient to dissolve the PVP. | |

Blend the methyclothiazide and pargyline hydrochloride, pass through a 40 mesh screen and reblend. Dissolve the PVP in absolute alcohol, add to the blend previously prepared and dry at 120° F. Finally, add the magnesium stearate through a 40 mesh screen, blend well and compress into tablets each of which will contain 2.5 mg. of methyclothiazide and 25 mg. of pargyline hydrochloride.

EXAMPLE 2

Fourteen patients with a known history of hypertension of from 1 to 15 years duration were administered placebo tablets for a period of from 4 to 36 weeks and their blood pressure checked daily. These same patients were then administered orally each day from 37 to 250 mg. of pargyline hydrochloride for a period of 10 to 51 weeks and their blood pressure checked daily. Following an interim placebo treatment of 2 to 15 weeks, the patients were administered orally 10 mg. of methyclothiazide daily for 3 to 25 weeks and their blood pressure was recorded each day. Finally, each of the 14 patients were administered 10 mg. of methyclothiazide and from 25 to 150 mg. of pargyline hydrochloride once a day for a period of from 1 to 52 weeks and their blood pressure was recorded daily with the following results wherein the blood pressures of all the patients are averaged and the average daily dose of pargyline hydrochloride given to each patient is as indicated.

| Medicament Amount Daily | Average Blood Pressure of all Patients in mm. Hg | | | |
|---|---|---|---|---|
| | Recumbent | Change | Standing | Change |
| None (control) | 199/110 | | 190/114 | |
| Pargyline HCl 140 mg | 165/100 | 34/10 | 152/94 | 38/20 |
| Methyclothiazide 10 mg | 174/107 | 25/3 | 167/107 | 23/7 |
| Methyclothiazide (10 mg.) plus 83 mg. pargyline HCl | 147/94 | 52/16 | 136/89 | 54/25 |

The above results indicate that a combination of 83 mg. of pargyline and 10 mg. of methyclothiazide produced a hypotensive effect much greater than that obtained when either 140 mg. of pargyline or 10 mg. of methyclothiazide were employed alone. These results clearly demonstrate that pargyline and methyclothiazide, when used concomitantly, are mutually activated or synergized in reducing blood pressure in hypertensive patients.

In addition to the synergistic effect obtained, the frequency of typical side effects observed by the use of pargyline hydrochloride alone such as insomnia, dizziness, weakness and nervousness was reduced 91% when this drug was employed in combination with methyclothiazide.

The same desirable synergistic effect on the lowering of blood pressure is observed when one part by weight of methyclothiazide per se or any of its pharmaceutically acceptable, alkali metal salts (preferably the sodium or potassium salt) is combined with from 2.5 to 15 parts by weight of pargyline per se or one of its non-toxic, acid-addition salts and administered orally to a warm-blooded, hypertensive host.

I claim:

1. An antihypertensive composition comprising as active ingredients from 1 part by weight of a compound selected from the group consisting of methyclothiazide and its alkali metal salts and from 2.5 to 15 parts by weight of a compound selected from the group consisting of pargyline and its pharmaceutically acceptable, acid-addition salts, the active ingredients of said composition being mutually activating.

2. A composition as claimed in claim 1 in which the active ingredients are admixed with an inert solid carrier and compressed into a tablet.

3. A composition as claimed in claim 2 which contains 1 part by weight of methyclothiazide and from 5 to 10 parts by weight of a pharmaceutically acceptable, acid-addition salt of pargyline.

4. A composition as claimed in claim 2 which contains 1 part by weight of methyclothiazide and about 8 parts by weight of pargyline hydrochloride.

5. A method of lowering blood pressure in a warm blooded, hypersenstive host which comprises administering to said host in oral dosage unit form a composition the active ingredients of which consist essentially of 1 part by weight of a compound selected from the group consisting of methyclothiazide and its alkali metal salts and from 2.5 to 15 parts by weight of a compound selected from the group consisting of pargyline and its pharmaceutically acceptable, acid-addition salts, said active ingredients being mutually activating.

6. A method as claimed in claim 5 in which the composition employed contains 1 part by weight of methyclothiazide and from 5 to 10 parts by weight of a pharmaceutically acceptable, acid-addition salt of pargyline.

7. A method as claimed in claim 5 in which the composition employed contains 1 part by weight of methyclothiazide and about 8 parts by weight of pargyline hydrochloride.

References Cited by the Examiner

UNITED STATES PATENTS 3,137,711  6/1964  Close _____ 260—397.7
3,155,584  11/1964  Martin _____ 167—65

OTHER REFERENCES

Physicians' Desk Reference (PDR), 16th Ed., page 505–6 (1962), Medical Economics, Inc.; Oradell, N.J.

JULIAN S. LEVITT, *Primary Examiner.*

MARTIN J. COHEN, *Assistant Examiner.*